United States Patent [19]

Steenbergen

[11] 4,441,743

[45] Apr. 10, 1984

[54] ADHESIVELY JOINED PIPE CONNECTION

[75] Inventor: Johannes F. Steenbergen, Ommen, Netherlands

[73] Assignee: Wavin B.V., Zwolle, Netherlands

[21] Appl. No.: 301,643

[22] Filed: Sep. 14, 1981

[30] Foreign Application Priority Data

Sep. 15, 1980 [NL] Netherlands .................... 8005161

[51] Int. Cl.³ .................... F16L 47/02; F16L 55/00; F16L 59/16
[52] U.S. Cl. .................................... 285/21; 285/45; 285/47; 285/DIG. 16
[58] Field of Search .............. 285/21, 47, 45, DIG. 16

[56] References Cited

U.S. PATENT DOCUMENTS

| 3,061,503 | 10/1962 | Gould et al. | 285/21 X |
|---|---|---|---|
| 3,235,289 | 2/1966 | Bliss | |
| 3,402,731 | 9/1968 | Martin | |
| 3,663,335 | 5/1972 | Sheedy | |
| 3,854,756 | 12/1974 | Couch | 285/47 |

FOREIGN PATENT DOCUMENTS

| 17254 | 10/1980 | European Pat. Off. | |
|---|---|---|---|
| 2614995 | 10/1977 | Fed. Rep. of Germany | 285/21 |
| 504642 | 4/1971 | Switzerland | 285/21 |
| 1222246 | 2/1971 | United Kingdom | |
| 1293371 | 10/1972 | United Kingdom | |
| 1337394 | 11/1973 | United Kingdom | |
| 1511540 | 5/1978 | United Kingdom | 285/21 |

Primary Examiner—Richard J. Scanlan, Jr.
Attorney, Agent, or Firm—Wilkinson, Mawhinney & Theibault

[57] ABSTRACT

An adhesively joined pipe connection comprises a male pipe part and a female pipe part of fiber reinforced plastics, both being provided with a foam plastic insulating layer. The foam plastic layer extends to the front end of the receiving portion of the female pipe part, a heating resistance foil being fixed to the outer side of said receiving portion by means of an adhesive. A sealing sleeve engages sealingly the outer side of tubular casings of the foam plastic layers upon the female and male pipe parts. Connecting wires connected with heating foil extend through the foam plastic layer.

A female pipe part of fiber reinforced plastics provided with a foam plastic layer is extending to the free end of a receiving portion and a heating resistance foil fixed to the outer side of said receiving portion. Wires connected to the resistance foil extend through the foam plastic layer.

7 Claims, 3 Drawing Figures

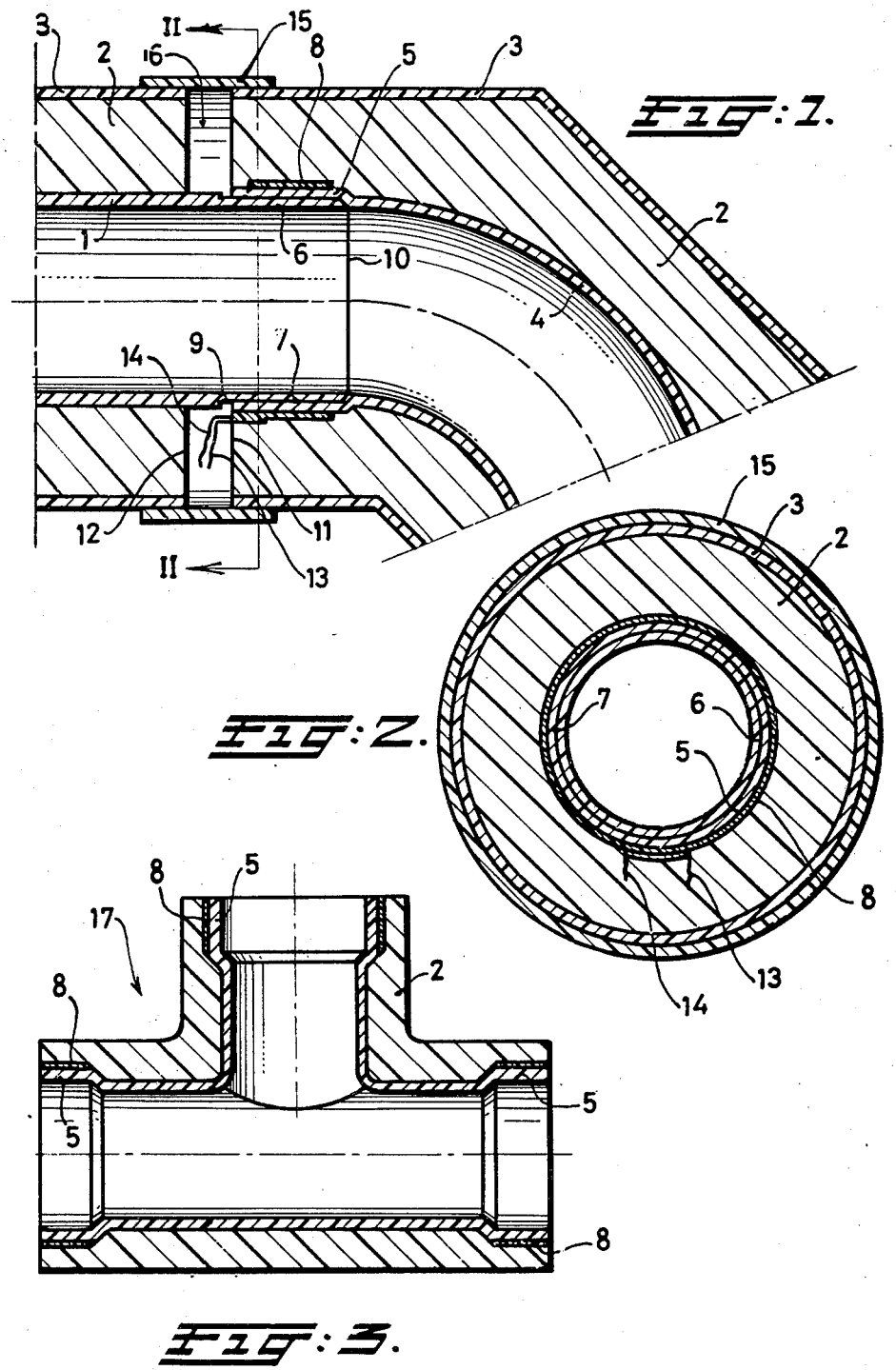

ADHESIVELY JOINED PIPE CONNECTION

BACKGROUND OF THE INVENTION

1. Field of the Invention

The present invention relates to an adhesively joined pipe connection, comprising a female pipe part and a male pipe part interconnected by means of a thermosetting adhesive.

2. Description of the Prior Art

In order to join fiber reinforced, and more particularly glass fiber reinforced, plastic pipes, use is made in the prior art particularly of adhesively joined pipe connections, an adhesive being provided between the inside of the female pipe part and the outside of the male pipe part to provide a good sealing connection. A drawback is that the adhesive used sets slowly at normal temperatures, so that a very long time is necessary before the adhered pipe connection can be subjected to the influence of the fluids conveyed through these pipes.

Another drawback is that the quality of the adhesive joint in pipe connections adhesively joined in this way, frequently leaves much to be desired, when normal ambient temperatures are used, so that leakages may occur in the course of time. When pipe parts of this kind are used particularly for conveying fluids at higher temperature, e.g. fluids used for heating purposes, this is a great disadvantage.

The only possibility of obviating these disadvantages is to supply external heat to the site where the thermosetting adhesive is situated.

When female and male pipe parts are used which are provided with a thermally insulating layer to their ends, end portions of the thermally insulating layer upon the outer side of the female pipe part must necessarily be removed in order to install a heating element around the receiving part of the female pipe part in order to heat the thermosetting adhesive, or else the receiving part of the female pipe part must be made without a thermally insulating layer in the actual production process. Apart from the associated expenses, this is very disadvantageous, since after the adhesively joined pipe connection has been made the space between the insulating layer on the female pipe part and on the male pipe part has to be filled by foaming a foamable plastic composition, and this entails laborious and labor-intensive operations. In addition, a heating element continually has to be installed and then removed again.

SUMMARY OF THE INVENTION

It is a primary object of the present invention to provide an adhesively joined pipe connection of the above type without these drawbacks and in which, after the adhesively joined pipe connection has been made, only small spaces need be filled with foam which operation can even be omitted when a plastic sleeve is fitted on the outer side of a covering of the thermally insulating layer around the whole at the site of the adhesively joined pipe connection.

To this end, according to the invention, the female pipe part bears a thermally insulating layer at least on its receiving portion and a heating element is also provided on said receiving portion.

The great advantage of these measures is that after the adhesive has been applied and the male pipe part has been pushed in, the required heat can be supplied to the thermosetting adhesive by means of the heating element without any adverse effect on the thermally insulating layer.

The heating element very advantageously consists of a resistance foil element. Resistance foil elements of this kind have the great advantage of being flexible, simple in construction and also very cheap.

Advantageously, the heating element is connected to the female pipe part by means of an adhesive, so that the heating element cannot readily be pulled out of this insulated female pipe part during transport of the latter.

The female and male pipe parts for the connection are advantageously made from fiber reinforced thermosetting plastics, e.g. polyester resins or epoxy resins.

To enable the heating element to be readily heated, connecting wires connected to the heating element project outwardly from the thermally insulating layer. The heating element can in this way be heated by means of an electrical source and the thermosetting adhesive can be rapidly set to that a very good adhesively joined connection is obtained rapidly and very simply in this manner.

Examples of female pipe parts may be plastic sleeves, bends, T-pieces, transition parts and the like.

The present invention is also embodied in a female pipe part suitable for an adhesively joined pipe connection, using a thermosetting adhesive, in which the female pipe part bears a thermally insulating layer at least on its receiving portion a heating element, preferably a resistance foil element, also being provided on said receiving portion.

Advantageously, the heating element is connected to the outer side of the female pipe part by means of an adhesive, connecting wires connected to the heating element advantageously projecting outwardly from the thermally insulating layer.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a longitudinal section through a pipe connection according to the present invention;

FIG. 2 is a section according to line II—II;

FIG. 3 is a female T-pipe part according to the invention.

DESCRIPTION OF PREFERRED EMBODIMENTS

Referring now to FIG. 1, a male pipe part 1 is shown of glass fiber reinforced thermosetting resin, e.g. an epoxy or polyester resin. The male pipe part is provided with a thermally insulating layer 2 of organic foam material in the form of a polyurethane foam material.

To avoid any damage to the thermally insulating foam layer 2, the outer side of the foam layer has a tubular casing 3 of polyethylene.

The figure further shows a female pipe part 4 (e.g. a band), also of glass fiber reinforced thermosetting resin, such as polyester or epoxy resin, with a receiving end portion 5. A layer 7 of thermosetting adhesive is provided between the inner wall of the receiving portion 5 and the outer side of the male pipe part 1, said layer having been set by heating.

To this end, a resistance foil 8 secured by means of an adhesive is provided directly on the outer side of the receiving portion 5 of the female pipe part 4.

A suitable resistance foil is the one marketed by Kanthal.

To obtain a good thermal insulation, a thermally insulating layer 2 is also provided on the outer side of the female pipe part 4, layer 2 extending substantially to the free end 9 of the female pipe part 4.

The thermally insulating plastic foam layer on the male pipe part 1 terminates at some distance from the head end 10 of the male pipe part 1, in the finished adhesively joined pipe connection, however, the front surface 11 of the plastic foam insulating layer 2 on the female pipe part 4 may practically adjoin the front end 12 of the plastic foam layer 2 on the male pipe part 1.

The outer side of the thermally insulating layer 2 on the female pipe part 4 is also provided with a tubular casing 3 of polyethylene material.

The resistance foil element 8 is connected to connecting wires 13 and 14 which may be connected to an electrical source to generate heat in the heating resistance foil element.

After the finished adhesively joined connection has been made, the space 16 between the front ends 11 and 12 of the thermally insulating layers 2 on the female pipe part 4 and the male pipe part 1 can be filled with foam.

Although filling this space 16 with foam can be omitted it is advisable to fill this space with a foam plastic material for the purposes of flexural rigidity. If these spaces are not filled with foam they may form pivots in the complete pipeline, which may be very disadvantageous.

In any case, a polyethylene covering sleeve 15 is heatshrunk on the outer side in order to provide a good sealing of space 16.

The ends of the connecting wires 13 and 14 are also accommodated in this space (see also FIG. 2).

Referring now to FIG. 3 the outer side of a female pipe part in the form of a T-piece 17 is provided with a thermally insulating layer 2. Layer 2 consists of polyurethane foam, and the same holds for the thermally insulating layer 2 on the male pipe part 1.

The T-piece 17 is also provided with a receiving portion 5 having on its outer side a resistance foil element 8, said element 8 in turn being covered by the thermally insulating layer 2.

Said thermally insulating layer 2 is also surrounded by a polyethylene tubular casing 3.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A plastic pipe connection, comprising a female pipe part and male pipe part, of fibre reinforced thermosetting plastics, secured together by means of a thermosetting adhesive, at least said female part (4) having a thermally insulating foam plastic layer (2) on its male-part receiving portion (5), characterized in that an electrically heatable foil element (8) covered by the insulating layer (2) is provided on the outer wall surface of the receiving portion (5).

2. A pipe connection according to claim 1, characterized in that the heatable foil element (8) is a resistance foil element.

3. A pipe connection according to claim 2, characterized in that the heatable element (8) is connected to the female pipe part (4) by means of an adhesive.

4. A pipe connection according to claim 3, characterized in that connecting wires (13, 14) connected to the heatable element (8) extend through the thermally insulating layer (2).

5. A pipe connection according to claim 1, characterized in that the outer side of the thermally insulating layer is surrounded by a protective tubular casing (3).

6. A pipe connection according to claim 1, characterized in that the ends of a protective tubular casing (3) of a male and a female pipe part (1, 4) sealingly engage a covering sleeve (15).

7. The female pipe part according to claim 6, characterized in that said foil element (8) is connected to the female pipe part (4) by means of an adhesive.

* * * * *